United States Patent
Liu

(10) Patent No.: US 10,181,773 B1
(45) Date of Patent: Jan. 15, 2019

(54) DETECTION DEVICE AND DETECTION METHOD OF ROTOR POSITION OF THREE-PHASE MOTOR

(71) Applicant: ANPEC ELECTRONICS CORPORATION, Hsinchu (TW)

(72) Inventor: Yi-Cheng Liu, New Taipei (TW)

(73) Assignee: ANPEC ELECTRONICS CORPORATION, Hsinchu (TW)

(*) Notice: Subject to any disclaimer, the term of this patent is extended or adjusted under 35 U.S.C. 154(b) by 0 days.

(21) Appl. No.: 15/906,035

(22) Filed: Feb. 27, 2018

(30) Foreign Application Priority Data

Jul. 5, 2017 (TW) .............................. 106122552 A

(51) Int. Cl.
*G01R 31/02* (2006.01)
*H02K 11/215* (2016.01)
*G01D 5/20* (2006.01)
*H02P 27/06* (2006.01)

(52) U.S. Cl.
CPC ............. *H02K 11/215* (2016.01); *G01D 5/20* (2013.01); *H02P 27/06* (2013.01)

(58) Field of Classification Search
CPC ........................................................ H02P 6/22
See application file for complete search history.

(56) References Cited

U.S. PATENT DOCUMENTS

2001/0045812 A1* 11/2001 Seki et al. ................ H02P 1/24
318/727

FOREIGN PATENT DOCUMENTS

TW          200529546 A        9/2005

* cited by examiner

*Primary Examiner* — Karen Masih
(74) *Attorney, Agent, or Firm* — Li & Cai Intellectual Property (USA) Office

(57) ABSTRACT

A detection device and a detection method of a rotor position of three-phase motor are disclosed which measure induced voltages under different voltage vectors and calculate an induced voltage relationship among the different induced voltages. Then the detection device and the detection method find out the rotor position suitable for the induced voltage relationship according to a rotor position table. Therefore, the detection device and the detection method can accurately detect the rotor position in a standstill state to prevent the three-phase motor from operating abnormally and burning out.

10 Claims, 9 Drawing Sheets

DETECTION DEVICE AND DETECTION METHOD OF ROTOR POSITION OF THREE-PHASE MOTOR

BACKGROUND

1. Technical Field

The present disclosure relates to a detection device and a detection method; in particular, to a detection device and a detection method of rotor position of three-phase motor.

2. Description of Related Art

A conventional three-phase motor includes a rotor and a stator. To accurately control the motor torque, the rotor absolute position is necessary. The conventional detection method uses a hall sensor to sense the rotor position. However, the hall sensor will increase the overall size and cost of the motor and will reduce the system stability. Many methods without using sensors have been provided to detect rotor position.

As shown in FIGS. 1A, 1B, and 2, the conventional detection principle of the rotor position is illustrated. As shown in FIG. 1A, the stator winding 10 is supplied with a current i to generate an induced magnetic field direction. When the induced magnetic field direction is opposite to the magnetic field direction of the rotor 20, the magnetic saturation effect will be weakened, so that the inductance of the stator winding 10 increases. As shown in FIG. 1B, the stator winding 10 is supplied with a current i to generate an induced magnetic field direction. When the induced magnetic field direction is the same as the magnetic field direction of a rotor 20, the magnetic saturation effect will be enhanced, so that the inductance of the stator winding 10 decreases. FIG. 2 shows the relationship diagram between the inductance of the stator winding 10 and the electrical angle of the rotor 20. As shown in FIG. 2, when the stator winding 10 and the rotor 20 are in the reverse magnetic field, the inductance of the stator winding 10 slightly increases. When the stator winding 10 and the rotor 20 are in the forward magnetic field, the inductance of the stator winding 10 slightly decreases. Therefore, the conventional three-phase motor can use the characteristics between the stator winding 10 and the rotor 20 to obtain the rotor position.

However, the detection method without using sensors cannot accurately detect the rotor position operating in the standstill state. It will result in a decrease of the starting torque of the motor and a temporary reversal of the motor at start-up. These situations are not allowed in some applications, such as hard drives. Therefore, if the rotor position can be accurately detected in the standstill state, it can prevent the three-phase motor from operating abnormally and burning out.

SUMMARY

An exemplary embodiment of the present disclosure provides a detection device of a rotor position of a three-phase motor. The detection device is used for detecting the rotor position of the three-phase motor in a standstill state. The stator winding of the three-phase motor is composed of three coils and each coil has a phase end. The detection device of the rotor position includes a full-bridge circuit, a logic circuit, a selector, and a processor. The full-bridge circuit is electrically connected to each phase end. The logic circuit is electrically connected to the full-bridge circuit. The logic circuit is configured for sequentially outputting six different voltage vectors to the full-bridge circuit to control the full-bridge circuit sequentially inducting two of the three coils. The six voltage vectors have a sequential relationship and relate to a phase commutation of the full-bridge circuit to provide the operation of the three-phase motor. The selector is electrically connected to each phase end and the logic circuit and configured for sequentially acquiring a voltage of the phase end of the non-inductive coil according to the six voltage vectors to generate six induced voltages. The processor is electrically connected to the selector. The processor receives the six induced voltages and has a rotor position table. The rotor position table has six different electrical position sections. An electrical period is composed of the six electrical position sections. Each electrical position section corresponds to the six voltage vectors. The six voltage vectors respectively have a predefined voltage value and there is a predefined voltage relationship among the six predefined voltage values. The processor calculates an induced voltage relationship among the six induced voltages, finds out the predefined voltage relationship suitable for the induced voltage relationship in the rotor position table, and takes the electrical position section corresponding to the predefined voltage relationship as the rotor position.

An exemplary embodiment of the present disclosure provides a detection method of a rotor position of a three-phase motor which is adapted for a detection device. The detection device is used for detecting the rotor position of the three-phase motor in a standstill state. The stator winding of the three-phase motor is composed of three coils and each coil has a phase end. The detection method includes the following steps: (A) sequentially outputting six different voltage vectors to induct two of the three coils, wherein the six voltage vectors have a sequential relationship to provide the operation of the three-phase motor; (B) sequentially acquiring a voltage of the phase end of the non-inductive coil according to the six voltage vectors to generate six induced voltages; (C) receiving the six induced voltages and calculating an induced voltage relationship among the six induced voltages; and (D) finding out a predefined voltage relationship suitable for the induced voltage relationship in a rotor position table and taking an electrical position section corresponding to the predefined voltage relationship as the rotor position, wherein the detection device stores the rotor position table, the rotor position table has six different electrical position sections, an electrical period is composed of the six electrical position sections, each electrical position section corresponds to the six voltage vectors, the six voltage vectors respectively have a predefined voltage value, and there is a predefined voltage relationship among the six predefined voltage values.

To sum up, the exemplary embodiments of the present disclosure provide the detection device and the detection method of the rotor position of the three-phase motor which measure induced voltages under different voltage vectors and calculate an induced voltage relationship among the different induced voltages. Then the detection device and the detection method find out the rotor position suitable for the induced voltage relationship according to a rotor position table. Therefore, the detection device and the detection method can accurately detect the rotor position in a standstill state to prevent the three-phase motor from operating abnormally and burning out.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1A:
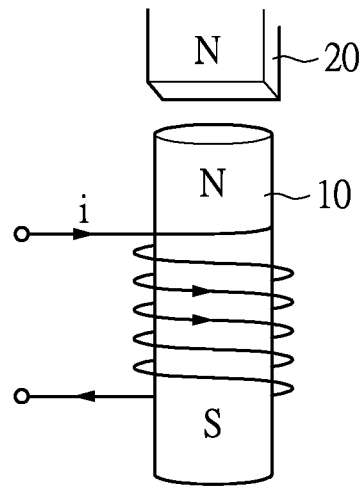
FIG. 1A shows a diagram of a reverse magnetic field between a conventional stator winding and a conventional rotor.
Figure 1B:
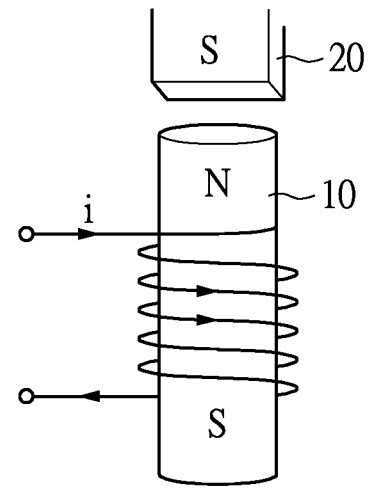
FIG. 1B shows a diagram of a forward magnetic field between a conventional stator winding and a conventional rotor.
Figure 2:
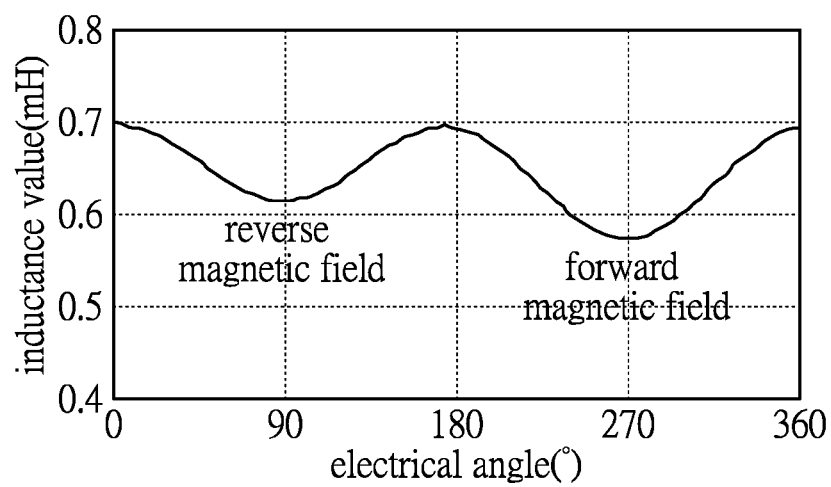
FIG. 2 shows a relationship diagram between the inductance of the stator winding and the electrical angle of the rotor.

Reference will now be made in detail to the exemplary embodiments of the present disclosure, examples of which are illustrated in the accompanying drawings. Wherever possible, the same reference numbers are used in the drawings and the description to refer to the same or like parts.

The present disclosure provides a detection device and a detection method of a rotor position of a three-phase motor. A full-bridge circuit sequentially inducts two of the three coils in the stator winding according to six different voltage vectors to generate six voltage values. Then a selector acquires the six voltage values to generate six induced voltages. Next, a processor calculates an induced voltage relationship among the six induced voltages and finds out a predefined voltage relationship suitable for the induced voltage relationship according to a rotor position table. More specifically, the rotor position table has six electrical position sections and an electrical period is composed of the six electrical position sections. Each electrical position section corresponds to the six voltage vectors. The six voltage vectors have a predefined voltage value respectively and there is a predefined voltage relationship among the six predefined voltage values. Lastly, the processor takes the electrical position section corresponding to the predefined voltage relationship as the rotor position. Therefore, the detection device and the detection method can accurately detect the rotor position in a standstill state to prevent the three-phase motor from operating abnormally and burning out. The detection device and the detection method of the rotor position of the three-phase motor provided in the exemplary embodiment of the present disclosure will be described in the following paragraphs.

Figure 3:
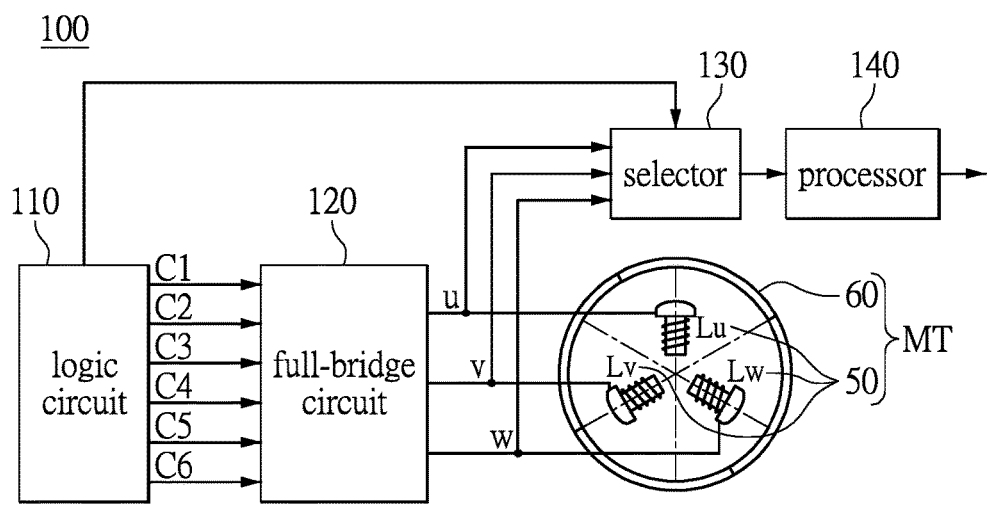
FIG. 3 shows a diagram of a detection device of a rotor position of a three-phase motor according to an embodiment of the present disclosure.
Figure 4:
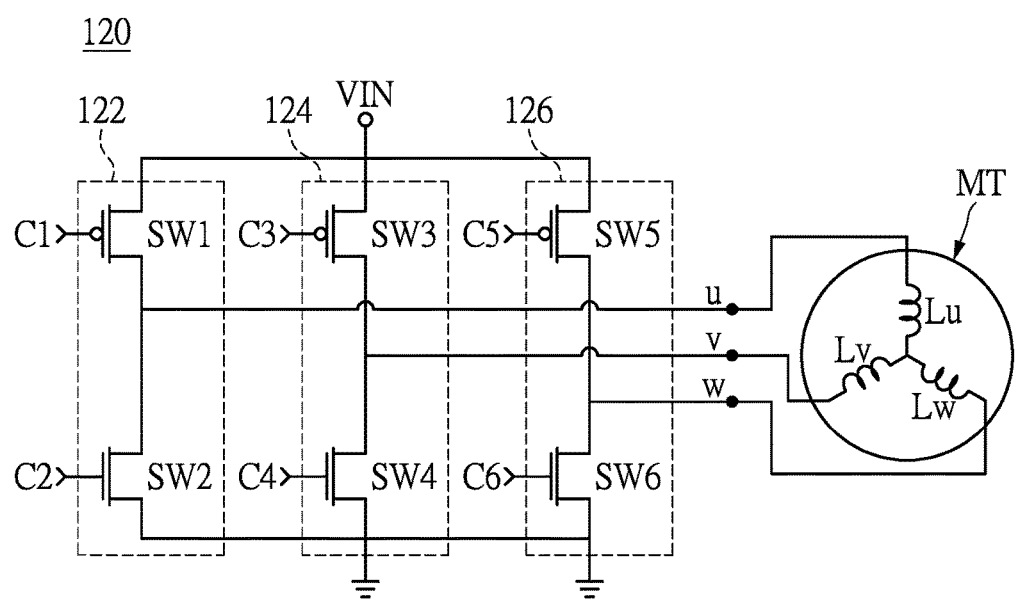
FIG. 4 shows a diagram of a full-bridge circuit according to an embodiment of the present disclosure.

Firstly, please refer to FIGS. 3-4. FIG. 3 shows a diagram of a detection device of a rotor position of a three-phase motor according to an embodiment of the present disclosure and FIG. 4 shows a diagram of a full-bridge circuit according to an embodiment of the present disclosure. As shown in FIG. 3, a detection device 100 is used for detecting a rotor position of a three-phase motor MT in a standstill state. The three-phase MT includes a stator winding 50 and a rotor 60. The stator winding 50 is composed of three coils, which are a first coil Lu, a second coil Lv, and a third coil Lw. The first coil Lu, the second coil Lv, and the third coil Lw have phase ends u, v, and w respectively. More specifically, the rotor 60 can be rotated with respect to the stator winding 50 by the magnetic force and the magnetic field change.

The detection device 100 includes a full-bridge circuit 120, a logic circuit 110, a selector 130, and a processor 140. The full-bridge circuit 120 electrically connects to the phase end u of the first coil Lu, the phase end v of the second coil Lv, and the phase end w of the third coil Lw. More specifically, the full-bridge circuit 120 is a three-phase full-bridge circuit having three bridge arms configured in parallel. The three bridge arms are a first bridge arm 122, a second bridge arm 124, and a third bridge arm 126 respectively. The first bridge arm 122 has a first switch SW1 and a second switch SW2. An end of the first switch SW1 receives the input voltage VIN. The other end of the first switch SW1 electrically connects to an end of the second switch SW2. The other end of the second switch SW2 connects to ground. The second bridge arm 124 has a third switch SW3 and a fourth switch SW4. An end of the third switch SW3 receives the input voltage VIN. The other end of the third switch SW3 electrically connects to an end of the fourth switch SW4. The other end of the fourth switch SW4 connects to ground. The third bridge arm 126 has a fifth switch SW5 and a sixth switch SW6. An end of the fifth switch SW5 receives the input voltage VIN. The other end of the fifth switch SW5 electrically connects to an end of the sixth switch SW6. The other end of the sixth switch SW6 connects to ground. In the present embodiment, the first switch SW1, the third switch SW3, and the fifth switch SW5 are P-type transistors and the second switch SW2, the fourth switch SW4, and the sixth switch SW6 are N-type transistors. In another embodiment, the first switch SW1, the third switch SW3, and the fifth switch SW5 are N-type transistors and the second switch SW2, the fourth switch SW4, and the sixth switch SW6 are P-type transistors. The first switch SW1, the second switch SW2, the third switch SW3, the fourth switch SW4, the fifth switch SW5, and the sixth switch SW6 can be replaced by other switches. The present disclosure is not limited thereto.

The logic circuit 110 electrically connects to the full-bridge circuit 120 and sequentially outputs six different voltage vectors to the full-bridge circuit 120 to control the full-bridge circuit 120 sequentially inducting two of three coils (i.e., the first coil Lu, the second coil Lv, and the third coil Lw). In the present embodiment, the six voltage vectors are respectively a first vector UV, a second vector UW, a third vector VW, a fourth vector VU, a fifth vector WU, and a sixth vector WV. The six voltage vectors all have six control signals C1, C2, C3, C4, C5, and C6 (i.e., related to a phase commutation of the full-bridge circuit). The six voltage vectors have a sequential relationship to provide the operation of the three-phase motor MT. This means that when the logic circuit 110 executes the phase switching of the full-bridge circuit 120 in sequence according to the six voltage vectors, the three-phase motor MT is driven to rotate for one circle.

In the present embodiment, the control signals C1, C2, C3, C4, C5, and C6 of the six voltage vectors are shown in <Table 1> as follows, wherein "H" indicates a high level and "L" indicates a low level.

TABLE 1

|  | C1 | C2 | C3 | C4 | C5 | C6 |
|---|---|---|---|---|---|---|
| first vector UV | H | L | L | H | L | L |
| second vector UW | H | L | L | L | L | H |
| third vector VW | L | L | H | L | L | H |
| fourth vector VU | L | H | H | L | L | L |
| fifth vector WU | L | H | L | L | H | L |
| sixth vector WV | L | L | L | H | H | L |

Persons of ordinary skill in this technology field should realize that when the logic circuit 110 executes the phase switching of the full-bridge circuit 120 according to the sequential relationship of the first vector UV, second vector UW, the third vector VW, the fourth vector VU, the fifth vector WU, and the sixth vector WV, the three-phase motor MT is driven to positively rotate for one circle. When the logic circuit 110 executes the phase switching of the full-bridge circuit 120 according to the sequential relationship of the first vector UV, the sixed vector WV, the fifth vector WU, the fourth vector VU, the third vector VW, the second vector UW, the three-phase motor MT is driven to negatively rotate for one circle. The detailed description is omitted. The aforementioned six voltage vectors can be other types for driving the three-phase motor MT to rotate for one circle. The present disclosure is not limited thereto.

For example, the logic circuit 110 outputs the first vector UV to the full-bridge circuit 120 in the standstill stage, and the logic circuit 110 turns on the first switch SW1 and the fourth switch SW4 and turns off the second switch SW2, the third switch SW3, the fifth switch SW5, and the sixth switch SW6 to induct the first coil Lu and the second coil Lv sequentially. Similarly, the logic circuit 110 outputs the second vector UW to the full-bridge circuit 120 in the standstill state, and the full-bridge circuit 120 inducts the first coil Lu and the third coil Lw sequentially. The logic circuit 110 outputs the third vector VW to the full-bridge circuit 120 in the standstill state, and the full-bridge circuit 120 inducts the second coil Lv and the third coil Lw sequentially. The logic circuit 110 outputs the fourth vector VU to the full-bridge circuit 120 in the standstill state, and the full-bridge circuit 120 inducts the second coil Lv and the first coil Lu sequentially. The logic circuit 110 outputs the fifth vector WU to the full-bridge circuit 120 in the standstill state, and the full-bridge circuit 120 inducts the third coil Lw and the first coil Lu sequentially. The logic circuit 110 outputs the sixth vector WV to the full-bridge circuit 120 in the standstill state, and the full-bridge circuit 120 inducts the third coil Lw and the second coil Lv sequentially.

Next, please refer to FIGS. 3-4; the selector 130 electrically connects to each phase end u, v, and w and the logic circuit 110. The selector 130 sequentially acquires a voltage of the phase end of the non-inductive coil according to the first vector UV to the sixth vector WV to generate six induced voltages. More specifically, the selector 130 is a multiplexer. The multiplexer receives the voltage of the phase end of the first coil Lu, the voltage of the phase end of the second coil Lv, and the voltage of the phase end of the third coil Lw. The multiplexer acquires the voltage of the phase end of the non-inductive coil according to the received voltage vector.

For example, when the logic circuit 110 outputs the first vector UV to control the full-bridge circuit 120 inducting the first coil Lu and the second coil Lv sequentially, the selector 130 acquires the voltage of the phase end of the third coil Lw according to the first vector UV. When the logic circuit 110 outputs the second vector UW to control the full-bridge circuit 120 inducting the first coil Lu and the third coil Lw sequentially, the selector 130 acquires the voltage of the phase end of the second coil Lv according to the second vector UW. When the logic circuit 110 outputs the third vector VW to control the full-bridge circuit 120 inducting the second coil Lv and the third coil Lw sequentially, the selector 130 acquires the voltage of the phase end of the first coil Lu according to the third vector VW. When the logic circuit 110 outputs the fourth vector VU to control the full-bridge circuit 120 inducting the second coil Lv and the first coil Lu sequentially, the selector 130 acquires the voltage of the phase end of the third coil Lw according to the fourth vector VU. When the logic circuit 110 outputs the fifth vector WU to control the full-bridge circuit 120 inducting the third coil Lw and the first coil Lu sequentially, the selector 130 acquires the voltage of the phase end of the second coil Lv according to the fifth vector WU. When the logic circuit 110 outputs the sixth vector WV to control the full-bridge circuit 120 inducting the third coil Lw and the second coil Lv sequentially, the selector 130 acquires the voltage of the phase end of the first coil Lu according to the sixth vector WV.

After the selector 130 sequentially acquires the voltage of each phase end, the selector 130 generates the six induced voltages to the processor 140 to accordingly find out the rotor position. The processor 140 electrically connects to the selector 130 and stores a rotor position table, as shown in <Table 2>. The rotor position table has six different electrical position sections POS1, POS2, POS3, POS4, POS5, and POS6. An electrical period is composed of the six electrical position sections POS1-POS6. In the present embodiment, the electrical period is 0-360 degrees. The electrical position sections POS1-POS6 are respectively located at 0-60 degrees, 60-120 degrees, 120-180 degrees, 180-240 degrees, 240-300 degrees, and 300-360 degrees. Each of the electrical position sections POS1-POS6 corresponds to the six voltage vectors (i.e., the first vector UV, the second vector UW, the third vector VW, the fourth vector VU, the fifth vector WU, and the sixth vector WV). The six voltage vectors respectively have predefined voltage values V1, V2, V3, V4, V5, and V6. There is a predefined voltage relationship among the six predefined voltage values V1-V6.

In the present embodiment, each of the electrical position sections POS1-POS6 and the corresponding predefined voltage values V1-V6 of the rotor position table are shown in <Table 2> as follows, wherein "x" indicates that the predefined voltage value is 0 or is close to 0; "+" indicates that the predefined voltage value is a positive voltage; "++" indicates that the predefined voltage value is a positive voltage higher than the voltage value "+"; "−" indicates that the predefined voltage value is a negative voltage; and "−−" indicates that the predefined voltage value is a negative voltage lower than the voltage value "−".

TABLE 2

|  | V1 | V2 | V3 | V4 | V5 | V6 |
| --- | --- | --- | --- | --- | --- | --- |
| electrical position section POS1 | x | ++ | + | x | − | −− |
| electrical position section POS2 | ++ | x | −− | − | x | + |
| electrical position section POS3 | − | −− | x | ++ | + | x |
| electrical position section POS4 | x | + | ++ | x | −− | − |
| electrical position section POS5 | + | x | − | −− | x | ++ |
| electrical position section POS6 | −− | − | x | + | ++ | x |

More specifically, in the electrical position section POS1, the predefine voltage relationship among the predefined values V1-V6 is (x, ++, +, x, −, −−). In the electrical position section POS2, the predefine voltage relationship among the predefined values V1-V6 is (++, x, −−, −, x, ++). In the electrical position section POS3, the predefine voltage relationship among the predefined values V1-V6 is (−, −−, x, ++, +, x). In the electrical position section POS4, the predefine voltage relationship among the predefined values V1-V6 is (x, +, ++, x, −−, −). In the electrical position section POS5, the predefine voltage relationship among the predefined values V1-V6 is (+, x, −, −−, x, ++). In the electrical position section POSE, the predefine voltage relationship among the predefined values V1-V6 is (−−, −, x, +, ++, x).

By virtue of the relationship between the electrical position sections POS1-POS6 and the corresponding predefined voltage values V1-V6, the processor 140 can find out the predefined voltage values V1-V6 suitable for the six received induced voltages in the rotor position table. More specifically, the processor 140 calculates an induced voltage relationship among the six induced voltages. The processor 140 then finds out the predefined voltage relationship suitable for the induced voltage relationship in the rotor position table, and takes the electrical position section corresponding to the predefined voltage relationship as the rotor position.

Figure 5A:
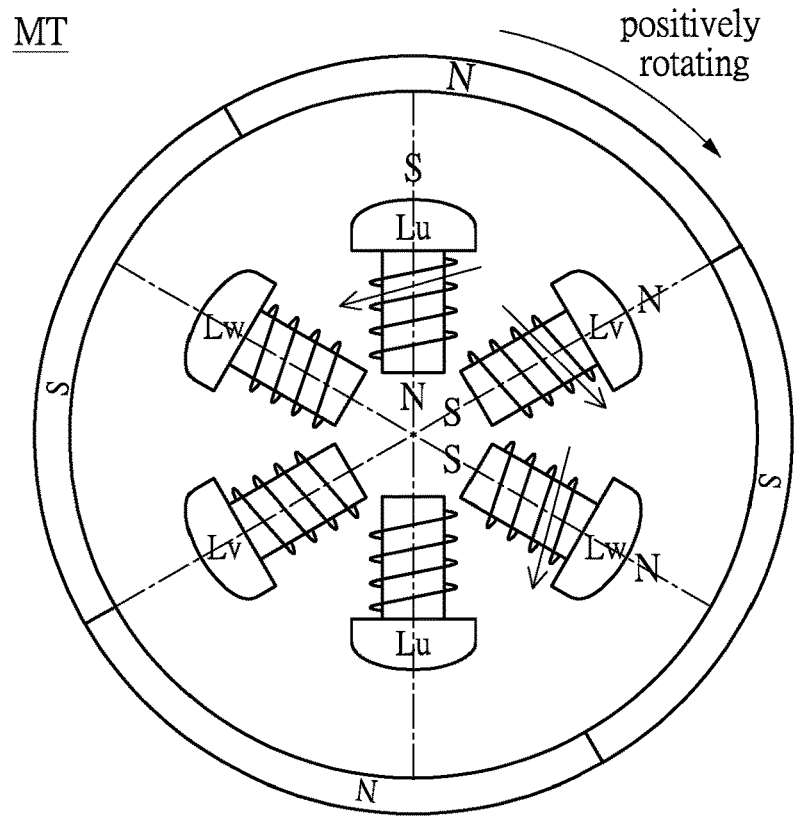
FIG. 5A shows a position diagram of a stator winding and a rotor according to an embodiment of the present disclosure.
Figure 5B:
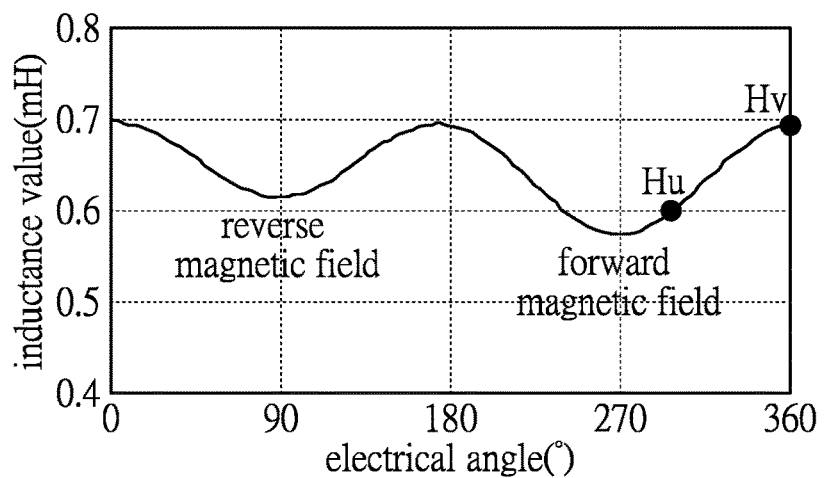
FIG. 5B shows a relationship diagram between the inductance of the stator winding and the electrical angle of the rotor according to an embodiment of the present disclosure.

The rotor position of the rotor 60 located at the electrical position section POS2 is taken as example in the following paragraph. Firstly, the logic circuit 110 sequentially outputs the first vector UV to the sixth vector to the full-bridge circuit 120 to induct two of the three coils. As shown in FIGS. 5A-5B, the full-bridge circuit 120 sequentially inducts the first coil Lu and the second coil Lv according to the first vector UV. The first coil Lu is a forward magnetic field and the second coil Lv has no magnetic field. The inductance value Hv of the second coil Lv is higher than the inductance value Hu of the first coil Lu (i.e., the corresponding induced voltage is "++").

Figure 6A:
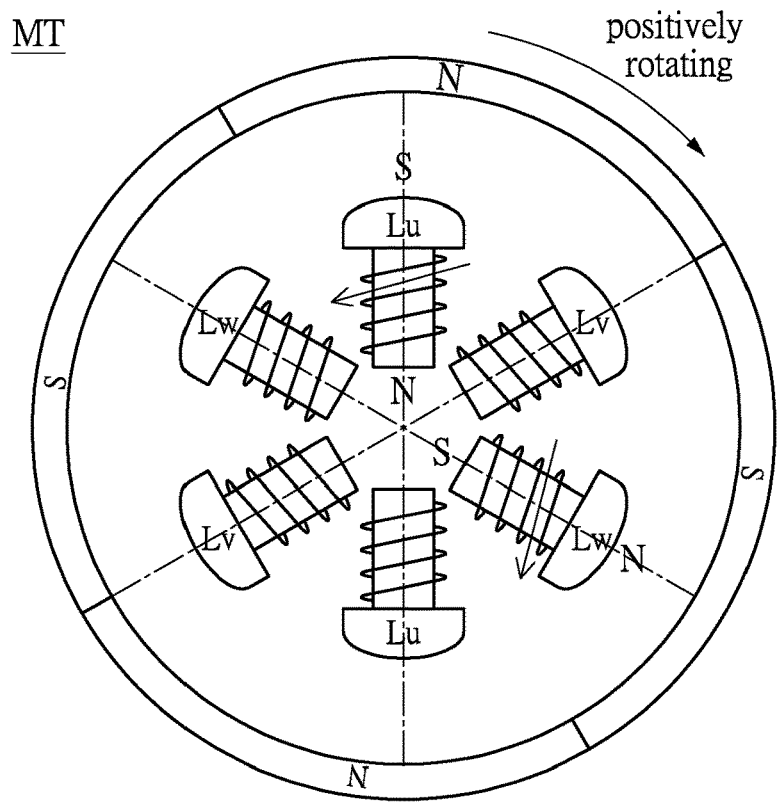
FIG. 6A shows a position diagram of a stator winding and a rotor according to another embodiment of the present disclosure.
Figure 6B:
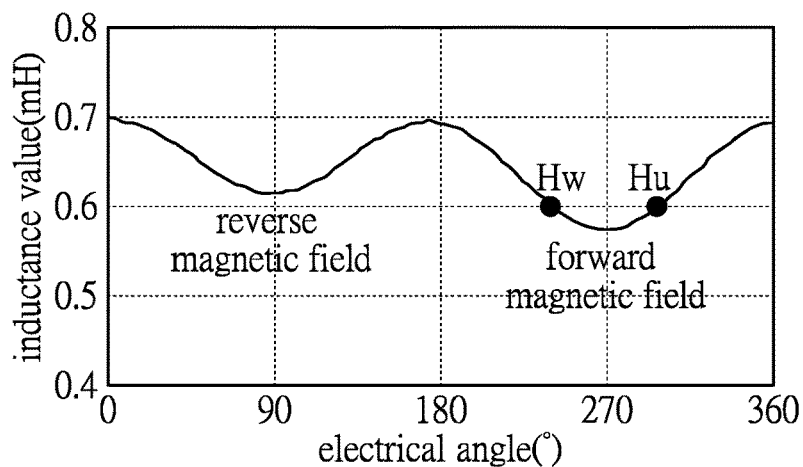
FIG. 6B shows a relationship diagram between the inductance of the stator winding and the electrical angle of the rotor according to another embodiment of the present disclosure.

As shown in FIGS. 6A-6B, the full-bridge circuit 120 sequentially inducts the first coil Lu and the third coil Lw according to the second vector UW. The first coil Lu and the third coil Lw are a forward magnetic field. The inductance value Hw of the third coil Lw is approximately equal to the inductance value Hu of the first coil Lu (i.e., the corresponding induced voltage is "x").

Figure 7A:
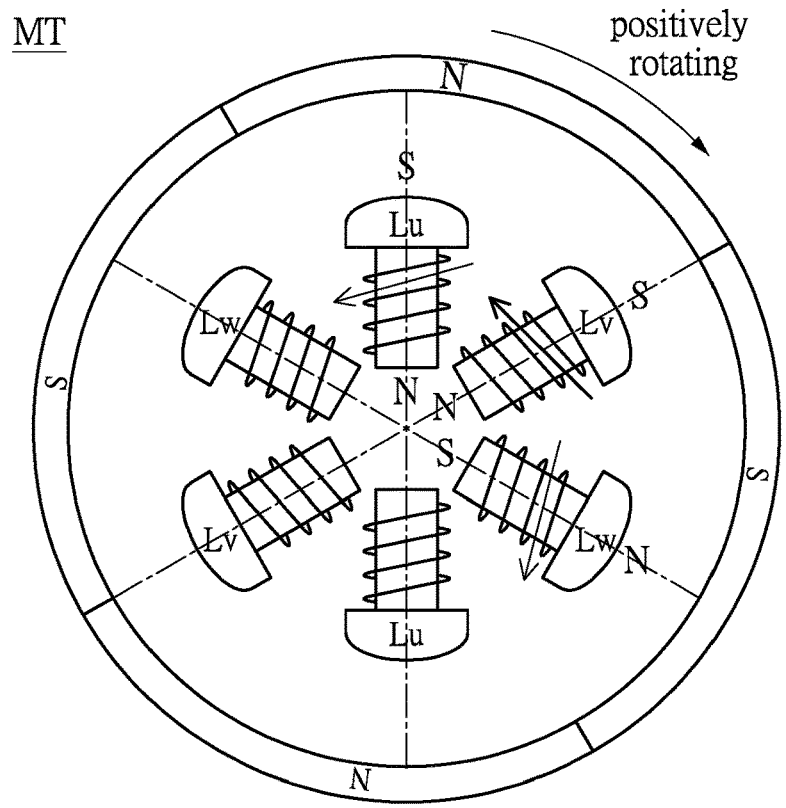
FIG. 7A shows a position diagram of a stator winding and a rotor according to another embodiment of the present disclosure.
Figure 7B:
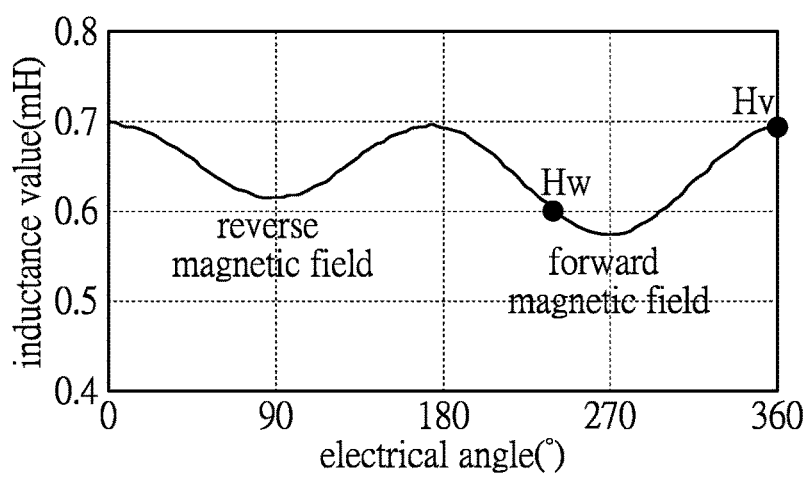
FIG. 7B shows a relationship diagram between the inductance of the stator winding and the electrical angle of the rotor according to another embodiment of the present disclosure.

As shown in FIGS. 7A-7B, the full-bridge circuit 120 sequentially inducts the second coil Lv and the third coil Lw according to the third vector VW. The second coil Lv has no magnetic field and the third coil Lw is a forward magnetic field. The inductance value Hw of the third coil Lw is less than the inductance value Hv of the second coil Lv (i.e., the corresponding induced voltage is "−−").

Figure 8A:
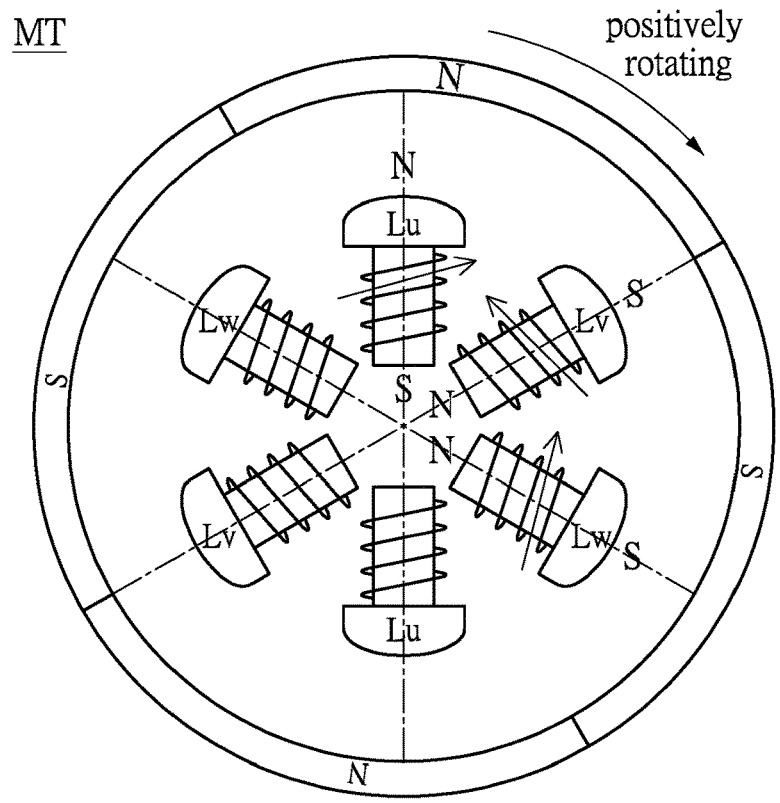
FIG. 8A shows a position diagram of a stator winding and a rotor according to another embodiment of the present disclosure.
Figure 8B:
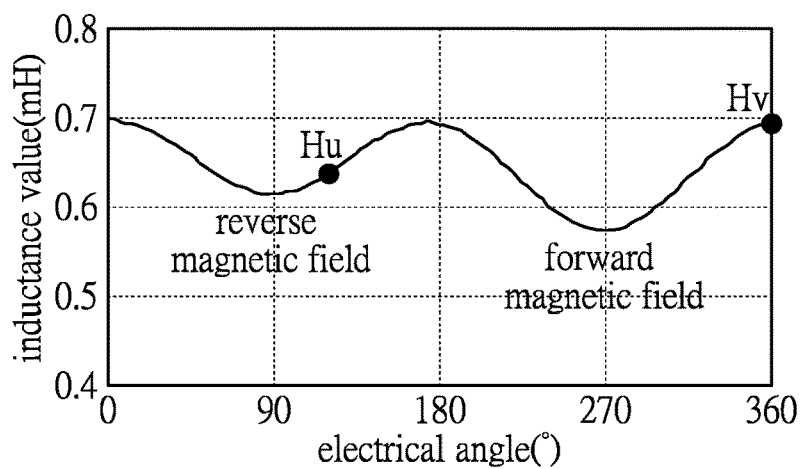
FIG. 8B shows a relationship diagram between the inductance of the stator winding and the electrical angle of the rotor according to another embodiment of the present disclosure.

As shown in FIGS. 8A-8B, the full-bridge circuit 120 sequentially inducts the second coil Lv and the first coil Lu according to the fourth vector VU. The second coil Lv has no magnetic field and the first coil Lu is a reverse magnetic field. The inductance value Hu of the first coil Lu is slightly less than the inductance value Hv of the second coil Lv (i.e., the corresponding induced voltage is "−").

Figure 9A:
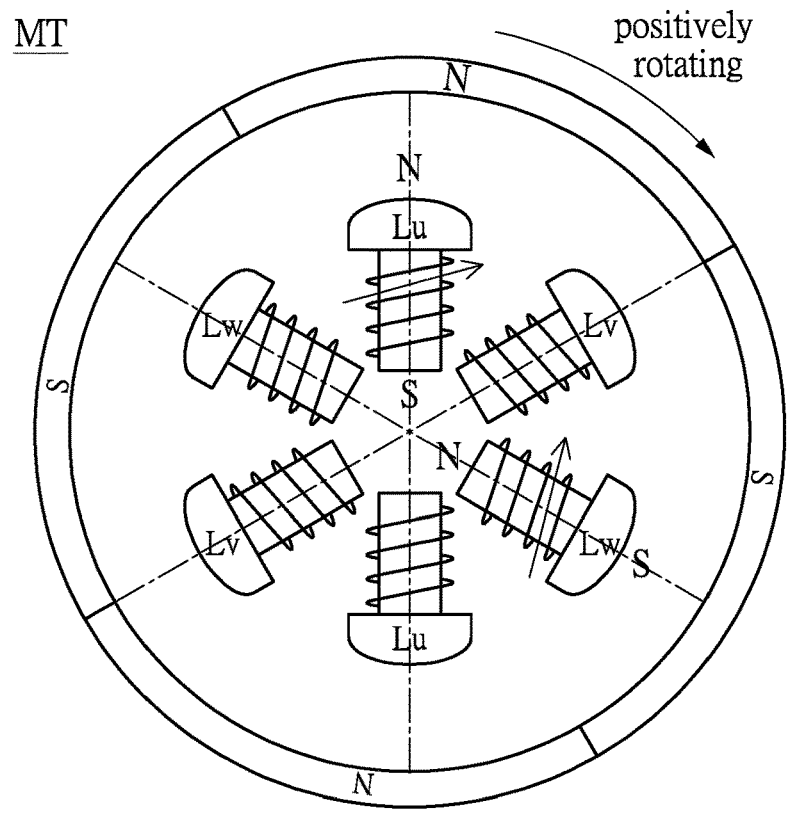
FIG. 9A shows a position diagram of a stator winding and a rotor according to another embodiment of the present disclosure.
Figure 9B:
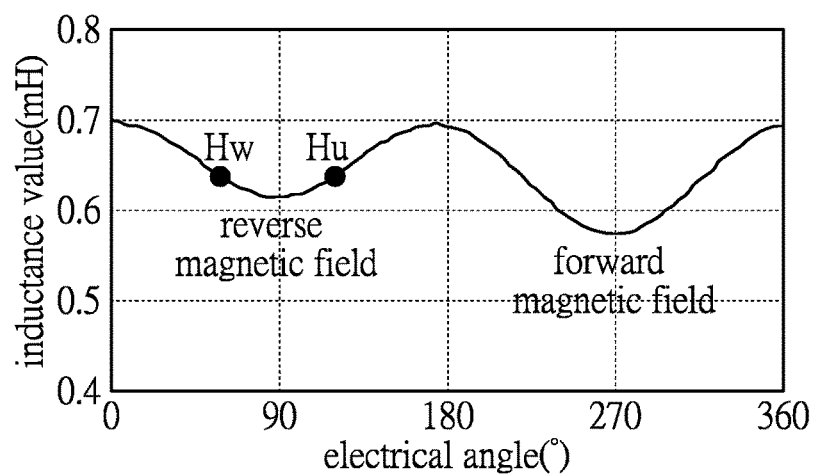
FIG. 9B shows a relationship diagram between the inductance of the stator winding and the electrical angle of the rotor according to another embodiment of the present disclosure.

As shown in FIGS. 9A-9B, the full-bridge circuit 120 sequentially inducts the third coil Lw and the first coil Lu according to the fifth vector WU. The third coil Lw and the first coil Lu are a reverse magnetic field. The inductance value Hw of the third coil Lw is approximately equal to the inductance value Hu of the first coil Lu (i.e., the corresponding induced voltage is "x").

Figure 10A:
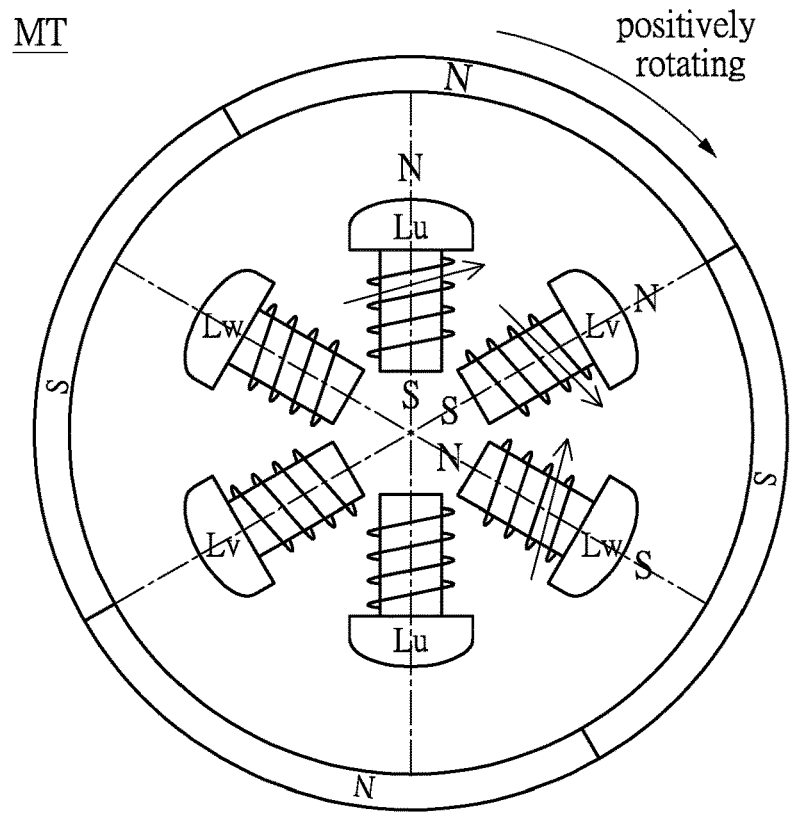
FIG. 10A shows a position diagram of a stator winding and a rotor according to another embodiment of the present disclosure.
Figure 10B:
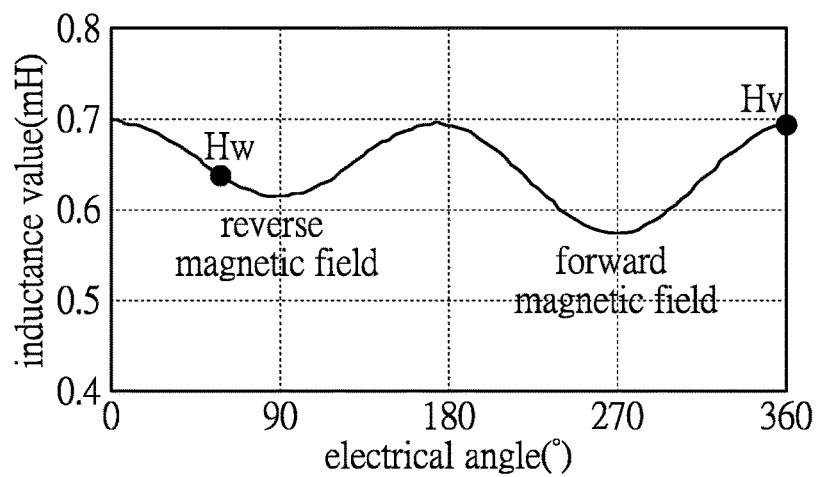
FIG. 10B shows a relationship diagram between the inductance of the stator winding and the electrical angle of the rotor according to another embodiment of the present disclosure.

As shown in FIGS. 10A-10B, the full-bridge circuit 120 sequentially inducts the third coil Lw and the second coil Lv according to the sixth vector WV. The second coil Lv has no magnetic field and the third coil Lw is a reverse magnetic field. The inductance value Hv of the second coil Lv is slightly higher than the inductance value Hw of the third coil Lw (i.e., the corresponding induced voltage is "+").

Accordingly, the processor 140 calculates that the induced voltage relationship among the six induced voltages is (++, x, −−, −, x, +). Lastly, the processor 140 finds out the predefined voltage relationship suitable for the induced voltage relationship in the rotor position table, i.e., the induced voltage relationship is (++, x, −−, −, x, +) and takes the electrical position section POS2 corresponding to the predefined voltage relationship as the rotor position. Therefore, the processor 140 determines that the present rotor positon is located at the electrical position section POS2.

Figure 11:
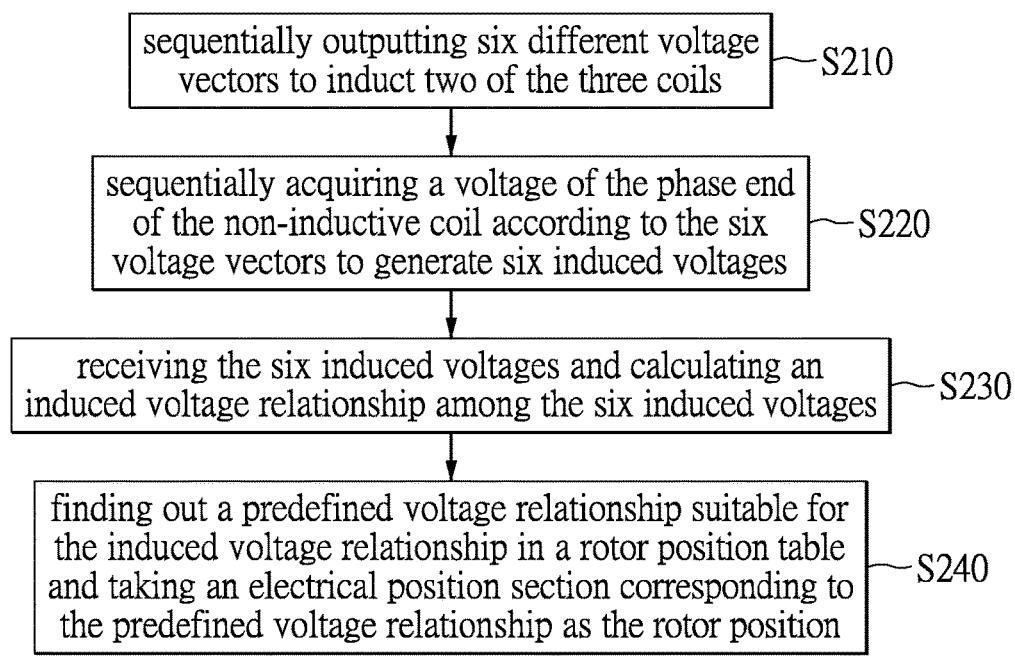
FIG. 11 shows a flowchart of a detection method of a rotor position of a three-phase motor according to an embodiment of the present disclosure.

From the aforementioned exemplary embodiments, the present disclosure generalizes a detection method of a rotor position of a three-phase motor, which is adapted for the aforementioned detection device 100. Please refer to FIGS. 3 and 11. Firstly, the detection device 100 sequentially outputs six different voltage vectors (i.e., the first vector UV, the second vector UW, the third vector VW, the fourth vector VU, the fifth vector WU, and the sixth vector WV) to induct two of the three coils (i.e., the first coil Lu, the second coil Lv, and the third coil Lw) (step S210). The six voltage vectors have a sequential relationship to provide the operation of the three-phase motor. With respect to step S210, this is illustrated in the aforementioned disclosure, so the detailed description is omitted.

Next, the detection device 100 sequentially acquires a voltage of the phase end of the non-inductive coil according to the six voltage vectors to generate six induced voltages (step S220). With respect to step S220, this is illustrated in the aforementioned disclosure, so the detailed description is omitted.

The detection device 100 then receives the six induced voltages and calculates an induced voltage relationship among the six induced voltages (step S230). With respect to step S230, this is illustrated in the aforementioned disclosure, so the detailed description is omitted.

Lastly, the detection device 100 finds out a predefined voltage relationship suitable for the induced voltage relationship in a rotor position table and takes an electrical position section corresponding to the predefined voltage relationship as the rotor position (step S240). The detection device 100 stores the rotor position table. The rotor position table has six different electrical position sections. An electrical period is composed of the six electrical position sections. Each electrical position section corresponds to the six voltage vectors. The six voltage vectors respectively have a predefined voltage value and there is a predefined voltage relationship among the six predefined voltage values. With respect to step S240, this is illustrated in the aforementioned disclosure, so the detailed description is omitted.

In summary, the present disclosure provides the detection device and the detection method of the rotor position of the three-phase motor to measure induced voltages under different voltage vectors and calculate an induced voltage relationship among the different induced voltages. Then the detection device and the detection method find out the rotor position suitable for the induced voltage relationship according to a rotor position table. Therefore, the detection device and the detection method can accurately detect the rotor position in the standstill state to prevent the three-phase motor from operating abnormally and burning out.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. A detection device of a rotor position of a three-phase motor, used for detecting the rotor position of the three-phase motor in a standstill state, wherein a stator winding of the three-phase motor is composed of three coils, each coil has a phase end, and the detection device of the rotor position comprises:
    a full-bridge circuit electrically connected to each phase end;
    a logic circuit electrically connected to the full-bridge circuit, configured for sequentially outputting six different voltage vectors to the full-bridge circuit to control the full-bridge circuit sequentially inducting two of the three coils, wherein the six voltage vectors have a sequential relationship and relate to a phase commutation of the full-bridge circuit to provide the operation of the three-phase motor;
    a selector electrically connected to each phase end and the logic circuit, and configured for sequentially acquiring a voltage of the phase end of the non-inductive coil according to the six voltage vectors to generate six induced voltages; and
    a processor electrically connected to the selector, configured for receiving the six induced voltages and having a rotor position table, wherein the rotor position table has six different electrical position sections, an electrical period is composed of the six electrical position sections, each electrical position section corresponds to the six voltage vectors, the six voltage vectors respectively have a predefined voltage value, and there is a predefined voltage relationship among the six predefined voltage values;
    wherein the processor calculates an induced voltage relationship among the six induced voltages, finds out the predefined voltage relationship suitable for the induced voltage relationship in the rotor position table, and takes the electrical position section corresponding to the predefined voltage relationship as the rotor position.

2. The detection device of the rotor position according to claim 1, wherein the selector is a multiplexer, and the multiplexer receives the voltage of the phase end of each coil and acquires the voltage of the phase end of the non-inductive coil according to the received voltage vector.

3. The detection device of the rotor position according to claim 1, wherein the three coils are a first coil, a second coil, and a third coil, and the full-bridge circuit includes:
    a first bridge arm having a first switch and a second switch, wherein an end of the first switch receives the input voltage, the other end of the first switch electrically connects to an end of the second switch and the phase end of the first coil, and the other end of the second switch connects to ground;
    a second bridge arm having a third switch and a fourth switch, wherein an end of the third switch receives the input voltage, the other end of the third switch electrically connects to an end of the fourth switch and the phase end of the second coil, and the other end of the fourth switch connects to ground; and
    a third bridge arm having a fifth switch and a sixth switch, wherein an end of the fifth switch receives the input voltage, the other end of the fifth switch electrically connects to an end of the sixth switch and the phase end of the third coil, and the other end of the sixth switch connects to ground.

4. The detection device of the rotor position according to claim 1, wherein the three coils are a first coil, a second coil, and a third coil, and the six voltage vectors include:
    a first vector configured for providing the full-bridge circuit inducting the first coil and the second coil sequentially;
    a second vector configured for providing the full-bridge circuit inducting the first coil and the third coil sequentially;
    a third vector configured for providing the full-bridge circuit inducting the second coil and the third coil sequentially;

a fourth vector configured for providing the full-bridge circuit inducting the second coil and the first coil sequentially;

a fifth vector configured for providing the full-bridge circuit inducting the third coil and the first coil sequentially; and a sixth vector configured for providing the full-bridge circuit inducting the third coil and the second coil sequentially.

5. The detection device of the rotor position according to claim 4, wherein the selector acquires the voltage of the phase end of the third coil according to the first vector, the selector acquires the voltage of the phase end of the second coil according to the second vector, the selector acquires the voltage of the phase end of the first coil according to the third vector, the selector acquires the voltage of the phase end of the third coil according to the fourth vector, the selector acquires the voltage of the phase end of the second coil according to the fifth vector, and the selector acquires the voltage of the phase end of the first coil according to the sixth vector.

6. The detection device of the rotor position according to claim 1, wherein the sequential relationship of the six voltage vectors is used to make the full-bridge circuit control the three-phase motor rotating positively or negatively.

7. A detection method of a rotor position of a three-phase motor, adapted for a detection device and used for detecting the rotor position of the three-phase motor in a standstill state, wherein a stator winding of the three-phase motor is composed of three coils, each coil has a phase end, and the detection method comprises:

sequentially outputting six different voltage vectors to induct two of the three coils, wherein the six voltage vectors have a sequential relationship to provide the operation of the three-phase motor;

sequentially acquiring a voltage of the phase end of the non-inductive coil according to the six voltage vectors to generate six induced voltages;

receiving the six induced voltages and calculating an induced voltage relationship among the six induced voltages; and finding out a predefined voltage relationship suitable for the induced voltage relationship in a rotor position table and taking an electrical position section corresponding to the predefined voltage relationship as the rotor position, wherein the detection device stores the rotor position table, the rotor position table has six different electrical position sections, an electrical period is composed of the six electrical position sections, each electrical position section corresponds to the six voltage vectors, the six voltage vectors respectively have a predefined voltage value, and there is a predefined voltage relationship among the six predefined voltage values.

8. The detection method of the rotor position according to claim 7, wherein the step of acquiring the voltage of the phase end of the non-inductive coil further includes:

receiving the voltage of the phase end of each coil and acquiring the voltage of the phase end of the non-inductive coil according to the received voltage vector.

9. The detection method of the rotor position according to claim 7, wherein the three coils are a first coil, a second coil, and a third coil, the six voltage vectors are a first vector, a second vector, a third vector, a fourth vector, a fifth vector, and a sixth vector, and the step of sequentially outputting the six different voltage vectors to induct two of the three coils further includes:

sequentially inducting the first coil and the second coil according to the first vector;

sequentially inducting the first coil and the third coil according to the second vector;

sequentially inducting the second coil and the third coil according to the third vector;

sequentially inducting the second coil and the first coil according to the fourth vector;

sequentially inducting the third coil and the first coil according to the fifth vector; and sequentially inducting the third coil and the second coil according to the sixth vector.

10. The detection method of the rotor position according to claim 9, wherein the step of sequentially acquiring the voltage of the phase end of the non-inductive coil according to the six voltage vectors further includes:

acquiring the voltage of the phase end of the third coil according to the first vector;

acquiring the voltage of the phase end of the second coil according to the second vector;

acquiring the voltage of the phase end of the first coil according to the third vector acquiring the voltage of the phase end of the third coil according to the fourth vector;

acquiring the voltage of the phase end of the second coil according to the fifth vector; and acquiring the voltage of the phase end of the first coil according to the sixth vector.

\* \* \* \* \*